US012236254B1

(12) United States Patent
Gadalin et al.

(10) Patent No.: US 12,236,254 B1
(45) Date of Patent: Feb. 25, 2025

(54) RESERVING INCREASED PERFORMANCE OF BURSTABLE INSTANCES FOR A LIMITED TIME PERIOD

(71) Applicant: Amazon Technologies, Inc., Seattle, WA (US)

(72) Inventors: Alexey Gadalin, Kirkland, WA (US); Alexander Gregory Bestavros, Seattle, WA (US); Ethan John Faust, Seattle, WA (US); Anton Valter, Renton, WA (US); Yuxuan Liu, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 868 days.

(21) Appl. No.: 17/304,334

(22) Filed: Jun. 18, 2021

(51) Int. Cl.
| | |
|---|---|
| *G06F 9/455* | (2018.01) |
| *G06F 9/48* | (2006.01) |
| *G06F 9/50* | (2006.01) |
| *G06F 11/32* | (2006.01) |
| *G06F 11/34* | (2006.01) |

(52) U.S. Cl.
CPC ........ *G06F 9/45558* (2013.01); *G06F 9/4881* (2013.01); *G06F 9/505* (2013.01); *G06F 9/5055* (2013.01); *G06F 11/324* (2013.01); *G06F 11/3409* (2013.01); *G06F 2009/4557* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 7,203,944 B1 * | 4/2007 | van Rietschote | G06F 9/4856 718/1 |
| 9,658,785 B2 * | 5/2017 | Brooker | G06F 3/0653 |
| 10,671,621 B2 * | 6/2020 | Ungar | H04L 67/1097 |
| 10,742,446 B2 * | 8/2020 | Tillotson | H04L 61/4511 |
| 10,742,554 B2 * | 8/2020 | Deb | H04L 63/18 |
| 10,884,778 B1 * | 1/2021 | Dunagan | G06F 9/45558 |
| 10,986,479 B2 * | 4/2021 | Maes | H04W 4/50 |
| 11,249,790 B1 * | 2/2022 | Gupta | G06F 9/5077 |
| 11,354,150 B1 * | 6/2022 | Guo | H04L 41/082 |
| 11,886,926 B1 * | 1/2024 | Gadalin | G06F 9/4856 |
| 2006/0277549 A1 * | 12/2006 | Li | G06Q 10/06393 718/104 |
| 2019/0179944 A1 * | 6/2019 | Ungar | H04L 41/5096 |

* cited by examiner

*Primary Examiner* — Van H Nguyen
(74) *Attorney, Agent, or Firm* — Lee & Hayes, P.C.

(57) ABSTRACT

This disclosure describes techniques for increasing the baseline performance of a burstable instance to an increased performance level for a limited time period. For example, a user may schedule a time period which the burstable instance has access to 100% of a CPU, instead of competing with other burstable instances even during periods of bursting as in prior techniques. In some cases, the user uses credits to reserve the time periods at which the increased performance level is requested. After receiving the reservation, a resource system selects computing resources to host the burstable instance such that the burstable instance, can operate at the requested increased performance level. After the time period has ended, the burstable instance may return to the baseline performance level.

20 Claims, 8 Drawing Sheets

RESERVING INCREASED PERFORMANCE OF BURSTABLE INSTANCES FOR A LIMITED TIME PERIOD

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

To increase the utilization of the computing resources, virtualization technologies may allow a single physical computing device to host multiple virtual computing resources. For example, a single computing device can host multiple instances of virtual machines (VM) (also referred to herein as "virtual machine instances," "VM instances," or simply "instances") that appear and operate as independent physical computing devices for users, but each share or are allocated portions of the computing resources of the single, underlying physical computing device. In this way, rather than having a single user or process underutilize the resources of a physical computing device, multiple users or processes can utilize the resources of the physical computing device to increase resource utilization.

To further increase the utilization of the computing resources, and also to more effectively meet the computing resource needs of users, service provider networks may offer a variety of different types of virtual machines. Specifically, a service provider network may offer a selection of VM instance types that are optimized to support different use cases on behalf of users. In such examples, the different VM instance types may be allocated different amounts, and/or different combinations, of the computing resources of underlying physical computing devices to provide users with flexibility to choose a VM instance that is more appropriately optimized to support their computing resource needs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
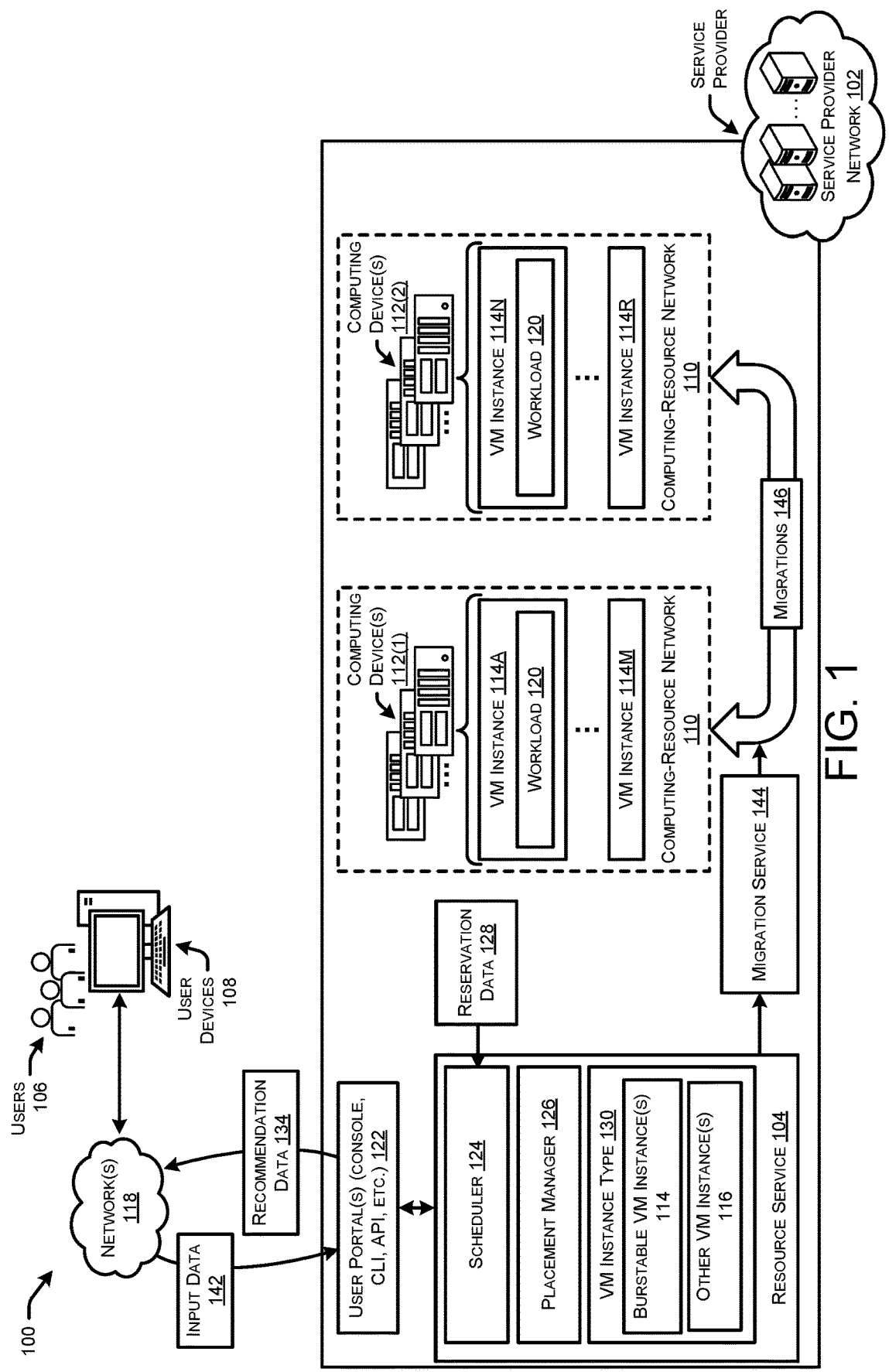
FIG. 1 is a software and network architecture diagram of an environment showing aspects of reserving increased performance of burstable instances for a limited time period.

This disclosure relates to techniques for reserving increased performance of a burstable instance for a limited time period. As used herein, a "burstable instance" is a computing resource, such as a VM instance, that provides a baseline performance level of CPU performance with the ability to burst to a higher level to support occasional spikes in usage. Each burstable performance instance earns a set rate of CPU credits over a period of time. This process can operate at a millisecond-level resolution, so a short burst of CPU uses a small fraction of a CPU credit. If a burstable performance instance uses fewer CPU resources than is required for baseline utilization (such as when it is idle), the unspent CPU credits are accrued in the CPU credit balance. If a burstable performance instance needs to burst above the baseline utilization level, it spends the accrued credits. The more credits that a burstable performance instance has accrued, the more time it can burst beyond its baseline when more CPU utilization is needed. The baseline performance level for a burstable instance is the level at which the instance uses CPU for a net credit balance of zero, meaning that the number of CPU credits being earned matches the number of CPU credits being used. When credits are exhausted, the instance returns to its baseline performance. A set of burstable instances that are all placed on a single host can be considered as "timesharing" the physical CPU cores of that host. A virtual machine manager running on the host can dynamically map the virtual CPUs (vCPUs) allocated to an instance to the physical CPUs of the host on demand, based on available credits, and may live migrate instances to other hosts when the aggregate need of the instances for vCPUs approaches or exceeds (or is predicted to approach or exceed) the physical CPU limits of the host.

In contrast to dedicated instance types that have guaranteed availability of full resource allocation, burstable instances are not guaranteed to reach any designated amount of CPU utilization above the baseline performance level during bursting. For example, a physical device may be hosting a large number of burstable instances that can result in throttling of CPU(s) on the computing platform during a time the instance is requesting a higher level (e.g., 100% of CPU usage). This may occur when multiple customer burstable instances burst and request high CPU usage at the same time, and the requested CPU usage is more than the physical computing device can provide. In this scenario, the available CPU power is distributed evenly across the customer instances leaving them under-powered.

Using the techniques and systems described herein, the user may reserve computing resources such that the burstable instance can temporarily move to an increased performance level that uses the CPU, and/or other computer resources that is above the baseline performance level for a limited time period. For instance, if the baseline performance level for a burstable instance is 20% CPU utilization, the requested increased performance level may be from 20% to 100% for the limited time period. In other examples, the increased performance level is 100% CPU use, as in dedicated instance types. During the limited time period, the burstable instance can use the computing resources at the increased performance level without having the possibility of being throttled below the increased performance level.

As noted above, the service provider networks may utilize virtualization technologies such that the computing devices can each host multiple VM instances that appear and operate as independent computing devices to support workloads of users. Rather than allocating all of the computing resources of a physical computing device to support a single workload, the computing resources of a physical computing device can be allocated amongst multiple VM instances that support different workloads. The service provider network supports many different types of workloads on behalf of users, and these workloads often have different computing resource needs. As described herein, a workload is implemented by a designated set of computing resources and the workload itself can be considered as code or logic that performs functionality using the computing resources. The service provider network may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of a service provider network.

In light of the different workloads that are supported on behalf of users, the service provider network may provide users with a selection of a variety of VM instance types optimized to support different workloads. Generally, each VM instance type may be allocated a different amount of computing resources, and/or different combination of computing resources, such that the VM instance types are optimized to support different workloads. As used herein, computing resources refers to compute, memory, storage, networking, and, in some implementations, graphics processing, or other types of specialized processing. As an example, one VM instance type may be allocated a larger amount of compute (e.g., processor cycles) and be optimized to support compute-heavy workloads, whereas another VM instance type may be allocated a larger amount of storage (e.g., disk space) and be optimized to support storage-intensive workloads. In this way, users can select a VM instance type or platform that is more optimized to support their workload, thereby increasing the performance of the workload while reducing underutilization of computing resources by the service provider network.

Generally, an increase in the complexity and diversity of VM instance types offered by the service provider network is advantageous and results in a higher likelihood that workloads are supported by a more optimized VM instance. While a large variety of VM instance types is advantageous for various reasons (e.g., efficient utilization of computing resources, high performance for workloads, etc.), it also may become difficult for users, particularly new users, to select a suitable or appropriate VM instance type to support their workload(s). For example, users may attempt to map out the computing resource needs of their workload and then peruse the offering of VM instance types to locate a VM instance type that seems appropriate for their needs.

In other examples, users may go through a time-consuming trial-and-error process to analyze performance of their workloads using different VM instance types. Not only is this time consuming, it may also result in users having their workloads hosted on VM instance types that are either overutilized and resource constrained, or underutilized and resulting in computing resources that may be unused and sitting idle. As an example, users may be overly cautious and select an oversized VM instance type to help ensure that their workloads are never resource constrained, which may result in low utilization of computing resources of the service provider network. In other examples, users may select a VM instance type that in some limited instances may not meet the demands of their workloads. For example, a user that has selected to use burstable instances may require a higher level of performance for a limited time period. Prior to techniques described herein, the user would not have a way to guarantee a desired level of CPU performance for a burstable instance.

In some examples, service provider networks may provide a resource service to help users configure, schedule, and utilize VM instance types to support their workloads. For instance, the resource service may provide users with the ability to reservice a higher increased performance level for burstable instance types for a limited time period. Instead of a user having to underutilize a dedicated instance type, the user may reserve the performance associated with a dedicated instance for a burstable instance for a limited time period. In this way, users may improve performance of their workloads during the times the workloads use more computing resources. Thus, a VM instance type, such as a burstable instance type, that may become over-provisioned (e.g., allocated too many resources to adequately support the workload) in a timeframe, may be temporarily configured to meet the requested performance.

As a specific example, a user might offer a virtual-desktop application that experiences high levels of traffic during part of workdays, but much lower levels of traffic in hours during other times. Thus, the workloads supporting the virtual-desktop application change according to a schedule. While the baseline performance of a burstable instance type meets the needs of the virtual-desktop application most of the time, the baseline performance of the burstable instance type does not meet the computing resource needs of the virtual-desktop application during the part of the workdays when high levels of traffic occur. Using the techniques and technologies implemented by a resource service of a service provider network, the user may continue to use burstable instances (or other instance types that do not guarantee a specified level of performance) even for workloads that temporarily require a higher performance level. In some examples, the user specifies when they would like to reserve the higher performance of the burstable instance(s). During these times, the burstable instance is configured to provide a desired level of performance, such as 100% CPU use. As such, the burstable instance is not subject to being over-provisioned during this requested time period.

According to some configurations, the resource service determines a placement of instances on computing resources, such as physical computing devices, which may be referred to herein as "hosts" such that the burstable instance(s) that have been reserved for increased performance provides the requested level of performance (e.g., CPU utilization) during the requested time.

In some cases, the user may specify a schedule of times to reserve the increased performance level above the baseline performance level for the burstable instances. For instance, the user may specify a daily, weekly, monthly schedule, and the like, for which the reservation applies.

In other examples, the service may identify patterns of increases and/or decreased in resource utilization in each day, week, month, etc., which may benefit from the reserved increased performance level for the instance. The resource service may generate a schedule according to which the workloads are to be placed such that the workloads are hosted by physical machines that can support the request by the user. In some configurations, the user uses credits to reserve the increased performance. For example, a user may purchase credits in advance of making the reservation. In other examples, the user may pay for the increased performance level at some point after making the reservation. For instance, the user may pay after confirmation of the reservation, or at some point after the increased performance level has been provided. The resource service may access the schedule and determine whether to migrate the workloads to meet the demand of the reserved computing resources. In some configurations, the service provider network may perform live migrations of the workloads such that the application being supported by the workloads does not suffer downtime.

The techniques described herein are equally applicable for other types of non-guaranteed VM instances and/or workloads. For example, a workload may be supported by a VM instance, by multiple VM instances, and/or by a fleet of VM instances. In some examples, one or more workloads may be supported by a fleet of VM instances that are scalable to support increases and/or decreases in use and may be placed behind one or more load balancing devices of the service provider network. In such examples, the techniques described herein may be applicable to all VM instances in a fleet that support various instances of the same workload.

This application describes techniques that increase the overall utilization of computing resources provided by servers or other hardware devices, such as CPU, GPU, memory, disk, and/or network availability. The resource service may determine placement of VM instances to support the reserved use of the computing resources such that computing resources of a service provider network remain more efficiently used. This reduces the amount of computing resources that are allocated or reserved for VM instances but sit idle or unused because the VM instances are oversized for the workload they support. Additionally, the techniques improve the performance of workloads by intelligently placing workloads on hosts based on computing needs during a particular time.

Although the techniques described herein are with reference to virtual machines or VM instances and virtual machine types, in some examples, the techniques are applicable to any type of virtual computing resource. For example, the techniques are generally applicable to any type of virtual computing resource that is allocated underlying portions of physical computing resources and executes within a virtual machine, or independently executes on the physical computing resources. Such virtual computing resources can include a container executing on a physical resource, a virtual machine instance running one or more containers, processes, software, and/or any other executable that is allocated portions of physical computing resources.

The service provider network described herein, such as a cloud provider network, may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In some examples, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

Certain implementations and examples of the disclosure will now be described more fully below with reference to the accompanying figures, in which various aspects are shown. However, the various aspects may be implemented in many different forms and should not be construed as limited to the implementations set forth herein. The drawings herein are not drawn to scale. Like numerals represent like elements throughout the several figures (which might be referred to herein as a "FIG." or "FIGS.").

FIG. 1 is a software and network architecture diagram of an environment 100 showing aspects of reserving increased performance of burstable instances for a limited time period. It is to be appreciated that the environment 100 is merely illustrative and that the various configurations disclosed herein can be utilized in many different types of computing environments.

To provide functionality disclosed herein, a service provider that operates one or more service/cloud provider networks 102 (sometimes referred to simply as a "cloud"), which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network, etc.) and the hardware and software in cloud provider data centers that provide those services.

The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/ or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients. The computing resources implemented by the service provider network 102 and executed on behalf of one or more users of the service provider can be data processing resources, such as VM instances, data storage resources, networking resources, data communication resources, network services, and other types of resources. The service provider network 102 can also include and utilize other types of computing resources not mentioned specifically herein.

According to some configurations, servers, such as computing devices 112, are utilized to provide at least a portion of the computing resources and execute software components to provide functionality described herein, including functionality related to the configuration and management of reserving, and providing an increased performance level for one or more instances. The software components can execute on a single server or in parallel across multiple servers in the service provider network 102. In addition, a software component can consist of subcomponents executing on different servers or other computing devices in service provider network 102. Various components can be implemented as software, hardware, or any combination of the two. In this regard, it is to be appreciated that the service provider network 102 shown in FIG. 1 has been simplified for discussion purposes and that many additional software and hardware components can be utilized.

As illustrated in FIG. 1, the computing devices 112 may each support VM instances that may or may not be different types of VM instances provided by the service provider network 102. For instance, computing device 112(1) may support one or more VM instances 114(1)-114(M) and computing devices 112(2) may support one or more VM instances 114(N)-114(R). Rather than allocating all the computing resources of an entire computing device 112 to support a workload 120 for the user 106, the service provider network may include a virtualization layer (e.g., containing one or more hypervisors) that includes instances of "virtual" computing resources (also referred to interchangeably herein as "virtual machines" or "VM instances") that represent the allocated portions of the physical computing resources of the computing devices 112. These VM instances 114 may emulate computing devices 112 to operate and support workloads, and may have their own operating systems, processing capabilities, storage capacity, and network connections or interfaces.

Users 106 may create user accounts with the service provider to utilize the resources and services of the service provider network. The users 106 may utilize their user devices 108 to communicate over one or more networks 118 (e.g., WANs, PANs, LANs, etc.) with the service provider network 102. The user devices 106 may comprise any type of computing device configured to communicate over network(s) 118, such as mobile phones, tablets, laptop computers, desktop computers, televisions, servers, and/or any other type of computing device. The users 106 may desire that the service provider network 102 host or support workloads 120 on the computing-resource network 110 that is managed by the service provider. Accordingly, the users 106 may, via their user account, request that a workload be launched on their behalf, and provide input data 142 via one or more user portals 122 (e.g., web console, command line interface (CLI), application programming interface (API), etc.).

The user portals 122 may provide the input data 142 to the resource service 104 which includes a scheduler 124, an placement manager 126, and a VM instance type library 130 storing indications of different VM instance types, such as burstable VM instance(s) 114 and other VM instance(s) 116 offered by the service provider network 102. In some examples, the resource service 104 may expose an API to schedule and configure computing resources to provide the increased performance level for one or more VMs 114.

The resource service 104 includes the placement manager 126 that is configured to determine placement of VM instances to support the workload 120 on behalf of the user 106. The service provider 102 may offer a wide variety of VM instance types that differ based on the amounts of physical computing resources allocated for use by the VM instance type 130, and/or the combinations of the types of physical computing resources allocated for use by the VM instance type 130. In some instances, there may be at least five high-level categories or types of computing resources included in the computing-resource network 110 and provided by the computing devices 112, which are CPU, GPU, memory, storage, and network throughput. The different VM instance types are allocated different amounts and/or combinations of these, and potentially other, computing resources. For example, the VM instance types may be allocated use of larger or smaller amounts of the different resource types to be optimized support workloads 120 with various computing resource utilization characteristics.

For example, the VM instance types 130 can include compute optimized types, memory optimized types, accelerated optimized types, storage optimized types, and/or network throughput optimized types. As a specific example, a VM instance type 130 that is compute optimized may be allocated use of 4 vCPUs of 3.0 GHz processors where each core can run at up to 3.5 GHZ, but only be allocated 8 gibibytes (GiB) of memory. Conversely, a VM instance type 130 that is memory optimized may be allocated 32 GiB of memory, but only run on a 3.1 GHz processor with 2 vCPUs.

In addition to optimizing the VM instance types 130 by varying the amounts or ratios of computing resource types allocated for use by the different VM instance types 130, the service provider may further include different sizes of VM instance types 130 for workloads 120 that require more or less computing resources at various ratios. For example, a smaller burstable VM instance may be allocated 1 vCPUs of a 3.3 GHz processor and 0.5 GB of memory, and a larger burstable VM instance 114 may be allocated 8 vCPUs on the 3.0 GHz processor and 32 GiB of memory. In other examples, a burstable VM instance may have different specifications (e.g., more/less memory, slower/faster processor, . . . ).

Accordingly, a user may select the VM instance type 130 to use for a workload 120 and/or the resource service 104 may recommend a VM instance type 130 to use. In many cases, users 106 would pick a VM instance type 130 that may be underutilized resulting in computing resources that may be unused and sitting idle. In some instances, the resource service 104 may provide the user devices 108 with recommendation data 134 that includes a recommendation for the user 106 to use a VM instance type 130. As described herein, a workload 120 may generally include a designated collection or grouping of computing resources (e.g., compute, memory, storage, networking, etc.) in the computing-resource network 110, and the code or logic that performs functionality using the computing resources. The service provider network 102 may support a wide variety of workloads 120, such as web servers, databases, customer-facing applications, distributed data stores, batch processing, machine/deep learning training and/or inference, online gaming, video encoding, memory caching, and/or any other type of workload that can be supported by computing resources of the computing-resource network 110.

The placement manager 126 may be configured to determine computing resources to host or support the workload 120 across different timeframes. For example, the resource manager 126 may access reservation data associated with the workload 120 to identify when to reserve computing resources for the workload 120 such that the burstable instance can temporarily use a designated percentage of the CPU and/or some other computing resources (e.g., memory, storage, . . . ) that is above the baseline performance level.

As noted above, the placement manager 126 may further identify different computing devices 112 that have available resources to host the VM instance(s) 114 during the reserved times (e.g., during the limited time period of the increased performance level). For instance, the placement manager 126 may determine that computing devices 112(2) have available resources to host the workload 120 during the requested time(s) to provide the computing resources for the increased performance level. During the limited time period, the burstable instance(s) can use the computing resources at the increased performance level without having the possibility of being throttled below the increased performance level. In some examples, the placement manager 126 generates a migration schedule according to which the workloads 120 are to be migrated to different computing device(s) 112 during the different timeframes.

The resource service 104 may provide data to the migration service 144 indicating to migrate the workloads 120 according to the migration schedule. The migration service 144 may perform live migrations 146 of the workloads 120 such that the workloads 120 do not suffer downtime. The migration service 144 may migrate the workload 120 from being hosted on computing device(s) 112(1), to being hosted on computing device(s) 112(2), based on the migration schedule. As described herein, a migration 146, including a live migration, refers to moving virtual machine instances (and/or other resources) between hosts in a cloud computing network, or between hosts outside of the cloud computing network and hosts within the cloud. Live migration refers to the process of moving a running virtual machine instance between different physical machines without significantly disrupting the availability of the virtual machine instance (e.g., the down time of the virtual machine instance is not noticeable by the end user). When the control plane initiates a live migration workflow it can cause the creation of a new "inactive" domain associated with the instance on a target host, while the original domain for the instance continues to run as the "active" domain on the source host.

Memory (including any in-memory state of running applications), storage, and network connectivity of the virtual machine are transferred from the original host with the active domain to the destination host with the inactive domain. For example, a local migration manager running on the source can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of the control plane, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded. Additional details relating to virtual machine instance migration are provided in U.S. application Ser. No. 16/442,325 (U.S. Pat. App. Pub. No. 2019/0310880), titled "MANAGED ORCHESTRATION OF VIRTUAL MACHINE INSTANCE MIGRATION," which is incorporated herein by reference in its entirety.

Generally, the resource service 104, and components thereof, may comprise software, firmware, and/or other logic that is supported one computing device, or across more computing devices in the service provider network 102. Additionally, the resource service 104 may comprise a system of other devices, such as software agents stored locally on VM instances.

Additional details regarding the various components and processes described briefly above for reserving increased performance of a burstable instance for a limited time period will be provided below with regard to FIGS. 2-8.

Figure 2:
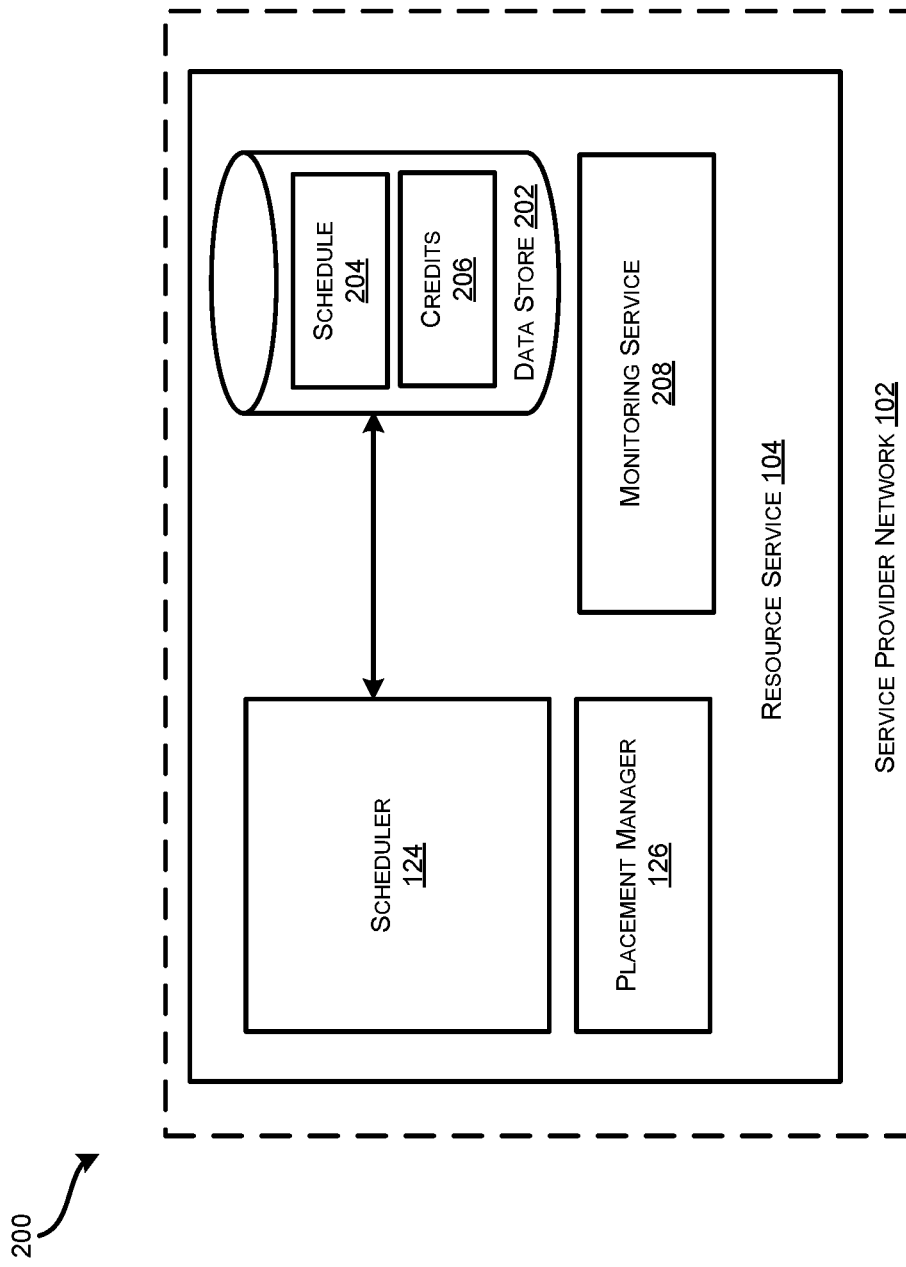
FIG. 2 is a software and network architecture diagram showing aspects of a resource service that reserves increased performance of a burstable instance for a limited time period.

FIG. 2 is a software and network architecture diagram showing aspects of a resource service 104 that reserves increased performance of a burstable instance for a limited time period. In the example illustrated in FIG. 2, the resource service 104 includes scheduler 124 coupled to data store 202, placement manager 126, and monitoring service 208. As discussed above, the scheduler 124 and/or some other device or component may use a schedule to determine the limited time periods to provide increased performance of a burstable instance for a user 106. For example, a user 106 may schedule increased performance for a single time period (e.g., Monday from 12 PM-3 PM), or multiple time periods (e.g., Tuesday, Thursday, Saturday at particular times). Generally, the user 106 may designate the limited time periods that they would like increased performance (e.g., 100% CPU utilization).

In contrast to dedicated instance types that have guaranteed availability of full resource allocation, prior to techniques described herein burstable instances were subject to CPU throttling (e.g., due to competition for the CPU by other burstable instances). As such, the burstable instance was not guaranteed to reach any designated CPU utilization above the baseline performance level during bursting. As such, an application that required a specified level of utilization of computing resources (e.g., 100% CPU utilization), the user 106 would be required to use a different instance type that had fixed resources.

According to some examples, the resource manager 104 determines a placement of the burstable instances that are associated with a request for the increased performance level such that the reserved increased performance level remains available to the burstable instances during the limited time period. In some examples, one or more burstable instances may be placed on a single CPU during the limited time period. During the limited time period, the CPU(s) on the computing device that host the burstable instances operating at the increased performance level are not reduced below the increased performance level during the limited time period. For example, when the increased level is 100% of the CPU usage, the burstable instance that have reserved the increased performance level can use 100% of the CPU without fear of being throttled. According to some examples, burstable instances that are scheduled for the increased performance level are prioritized by the resource service 104 over burstable instances operating at the baseline performance level. For instance, the resource service 104 may prioritize placement of the burstable instances that are scheduled for the increased performance level over the placement of other burstable instances. In some examples, the instances that are scheduled for the increased performance level may have priority when load balancing is performed.

As discussed above, the placement manager 126 may be configured to determine computing resources to host or support the workload 120 across different timeframes. In some configurations, the placement manager 126 may interact with a monitoring service 208 that is configured to monitor computing resources provided by the service provider network 102. For example, the monitoring service 208 may identify the computing device(s) 112 that have available resources for hosting the workload 120 during normal operation and during the limited time period of increased performance. After the limited time period, the resource service 104 may return the burstable instances to the baseline performance level.

According to some configurations, the user 106 purchases credits 206 and/or authorized payment for the credits that are used to reserve the increased performance during the limited time periods. Each credit 206 may be associated with a specified time period for the increased performance of the burstable instance (e.g., one minute, two minutes, . . . ). In some examples, a user 106 may not reserve the increased performance of the burstable instance unless the user 106 has enough credits 206 for the requested time period of the increased performance and/or has made some other billing arrangement for payment of the increased performance level. In some embodiments, the user 106 may purchase or otherwise acquire additional credits that can be utilized to reserve the increased performance of the burstable instance.

Figure 3:
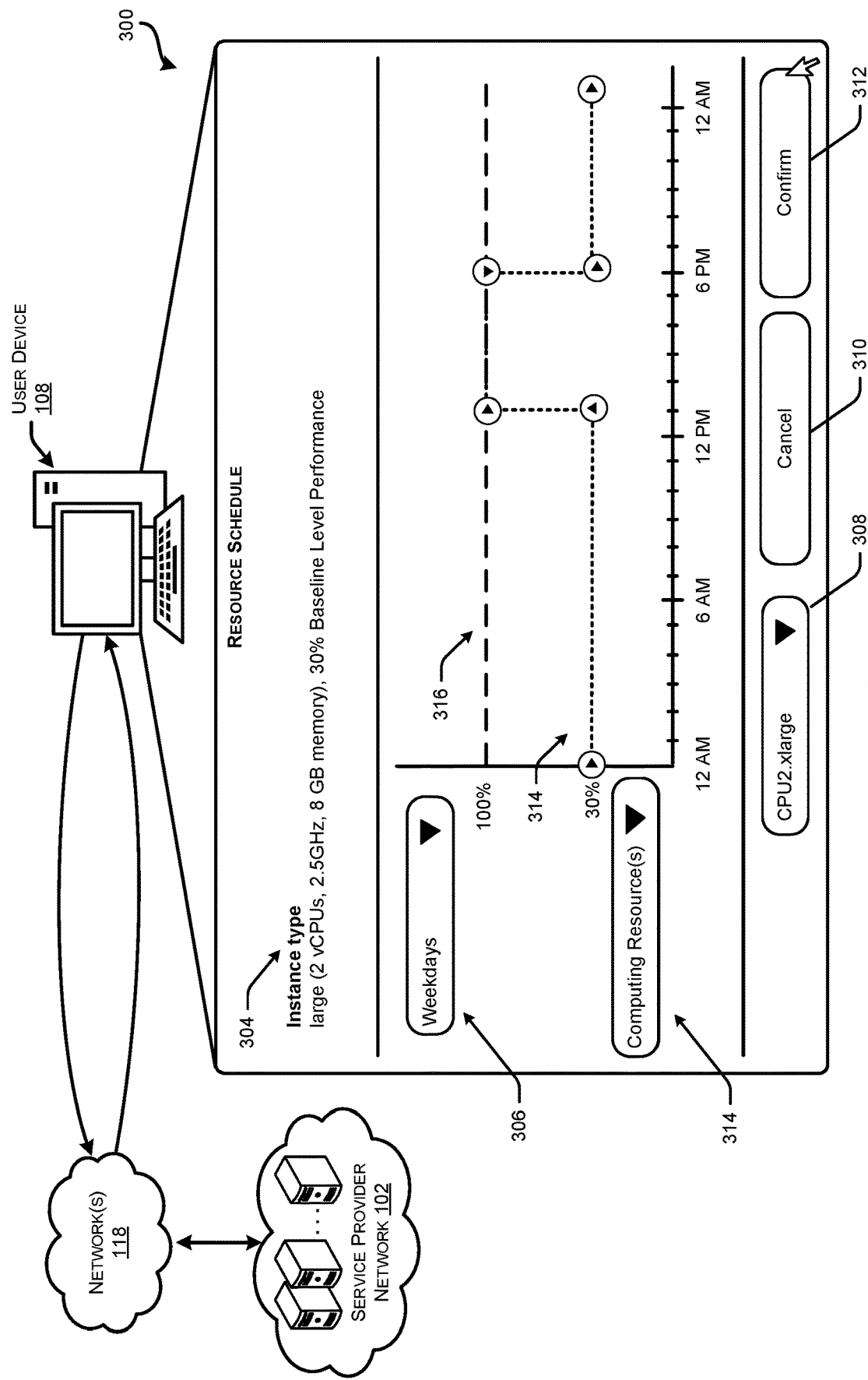
FIG. 3 is a diagram showing an exemplary graphical user interface for viewing, configuring, and scheduling increased performance for a burstable instance.

FIG. 3 is a diagram showing an exemplary graphical user interface 300 for viewing, configuring, and scheduling increased performance for a burstable instance. GUI 300 includes user interface (UI) elements for viewing and specifying times for reserving increased performance of an instance type. More or fewer UI elements may be included within GUI 300.

As illustrated, the GUI 300 presents an indication of the current instance type 304 being used to host the workload 120. As discussed above, the instance type may be any instance type, such as a burstable instance type, that does not allocate an entirety of the computing resources to the workload 120. The GUI 300 may include a time option 306 through which the user 106 can specify the time(s) to increase the performance of the selected instance type. In the current example, the user 106 has selected to reserve an increase in performance to 100% CPU utilization as indicated by dashed line 316 on weekdays from 1 PM to 6 PM as illustrated in the reservation 314 that may be presented on the display of user device 108. In other examples, the user 106 can select to reserve an increase in performance to some other CPU utilization, e.g., from above the baseline performance to 100% CPU utilization.

In some configurations, the GUI 300 may include a computing resource option 314 through which the user 106 can specify the computing resource(s) that they would like to increase during the limited time period. For instance, the user may select to increase one or more of the CPU utilization, memory, networking, storage, and/or other types of computing resources. For example, the user 106 may select to increase the performance level of the CPU to 90% utilization, and to increase the memory from 8 GiB to 16 GiB. As another examples, the user 106 may select to increase the networking performance for the limited time period.

In some examples, the user 106 may be presented with a change instance type option 308. The user 106 may be able to select the change instance type option 308 to a different instance type. For example, the user 106 may change the instance type to a burstable instance type that increases/decreases performance as compared to the current instance type. As discussed above, the user 106 may desire to temporarily increase the performance of a burstable instance in limited scenarios/time periods without having to worry about the burstable instance not having enough computing resources due to competition from other burstable instances, or some other factor. For example, an application may require full CPU utilization during a small time period in the day.

If the user 106 is satisfied with the reservation 140, the user 106 can select the confirm option 312 indicated that they would like to confirm the reservation 228. The user device 108 may then send selection data 516 to the service provider network 102 indicating that the user 106 would like to use the reservation 140. The service provider network 102 may then place/migrate the workloads 120 of the user 106 according to the reservation 140 such that the workload 120 may use the increased performance of the instance type during the reserved time.

Figure 4:
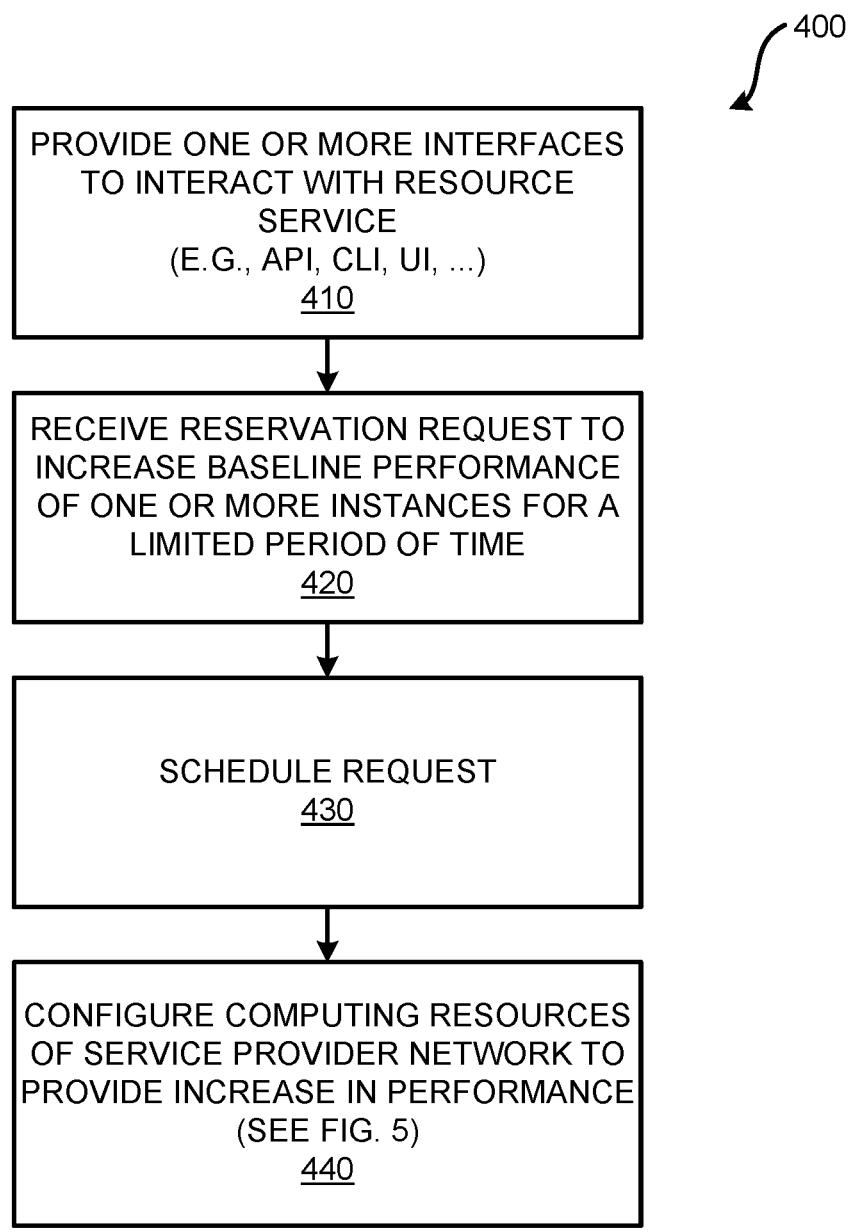
FIG. 4 is a flow diagram showing an illustrative routine for reserving and increasing the performance of a burstable instance within a service provider network.
Figure 5:
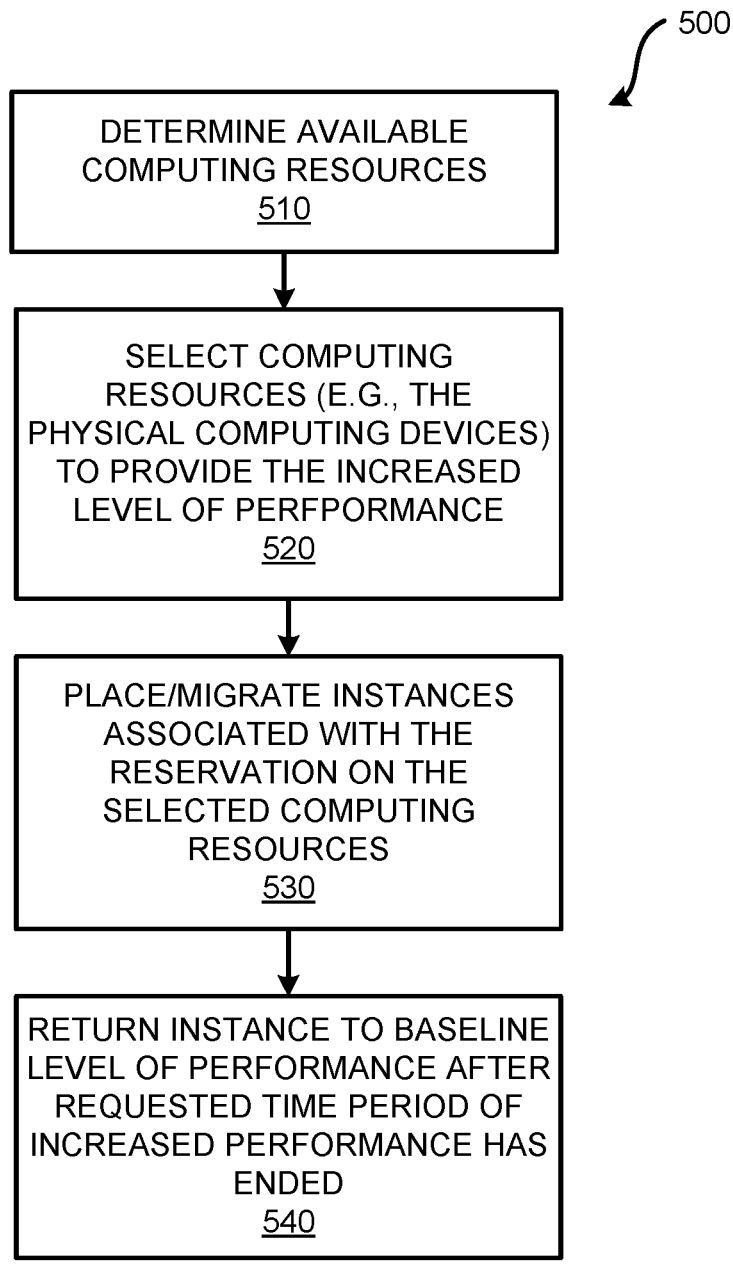
FIG. 5 is a flow diagram showing an illustrative routine for configuring the computing resources to support the requested increase in performance of the burstable instance.

FIGS. 4-5 are flow diagrams showing illustrative routines 400 and 500 for reserving and configuring computing resources for an increased level of performance for burstable instances for a limited time period, according to examples disclosed herein. It should be appreciated that the logical operations described herein with respect to FIG. 4, FIG. 5, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing an illustrative routine 400 for reserving and increasing the performance of a burstable instance within a service provider network 102. The routine 400 may be performed by computing resources associated with the service provider network 102 and/or other computing resources, such as computing resources associated with some other network or system.

At 410, one or more interfaces are provided for interacting with a resource service. The service provider network 102 may expose one or more API(s), a CLI, and/or a UI, such as the graphical user interface 300. A user, such as user 106, may utilize the interfaces to configure, view, and manage the increase in performance of the burstable instance.

At 420, a reservation request is received to increase the baseline performance of one or more instances for a limited time period. For example, the reservation request may include data that identifies one or more time(s) at which to reserve the requested increase in performance. As discussed above, the request may be received from a user, such as user 106 of a service provider network 102. In some examples, the resource service 104 within service provider network 102 receives the request.

At 430, the request is scheduled. As discussed above, the resource service 104 of the service provider network 102 may receive the request and store the requested time(s) to increase the performance of the instance in a schedule 204 that is stored in a data store 202. In some examples, the reservation is not made unless the user 106 has enough credits for the requested time for the increase in performance, and/or the user 106 has authorized some other payment method and/or billing arrangement.

At 440, computing resources of the service provider network 102 are configured to provide the requested increase in performance. As discussed above, the resource service 104 may place/migrate one or more instances in order to provide the increased performance during the requested time. More details are provided below with regard to FIG. 5.

FIG. 5 is a flow diagram showing an illustrative routine 500 for configuring the computing resources to support the requested increase in performance of the burstable instance. The routine 500 may be performed by computing resources associated with the service provider network 102 and/or other computing resources associated with a network.

At 510, available computing resources may be determined. As discussed above, the resource service 104 and/or some other device/component may determine the available computing devices 112 and/or other computing resources during the requested time of the increased performance of the instance.

At 520, the computing resources to provide the increased level of performance are selected. As discussed above, resource service 104 may determine the physical computing devices to host the instance(s) 114 which are to have the increased level of performance during the requested time.

At 530, the instances are placed/migrated onto the selected computing resources. As discussed above, the resource service 104 may interact with the migration service 144 to migrate one or more instances 114 to one or more different computing devices such that the instance(s) are provided with the requested level of increased performance.

Figure 6:
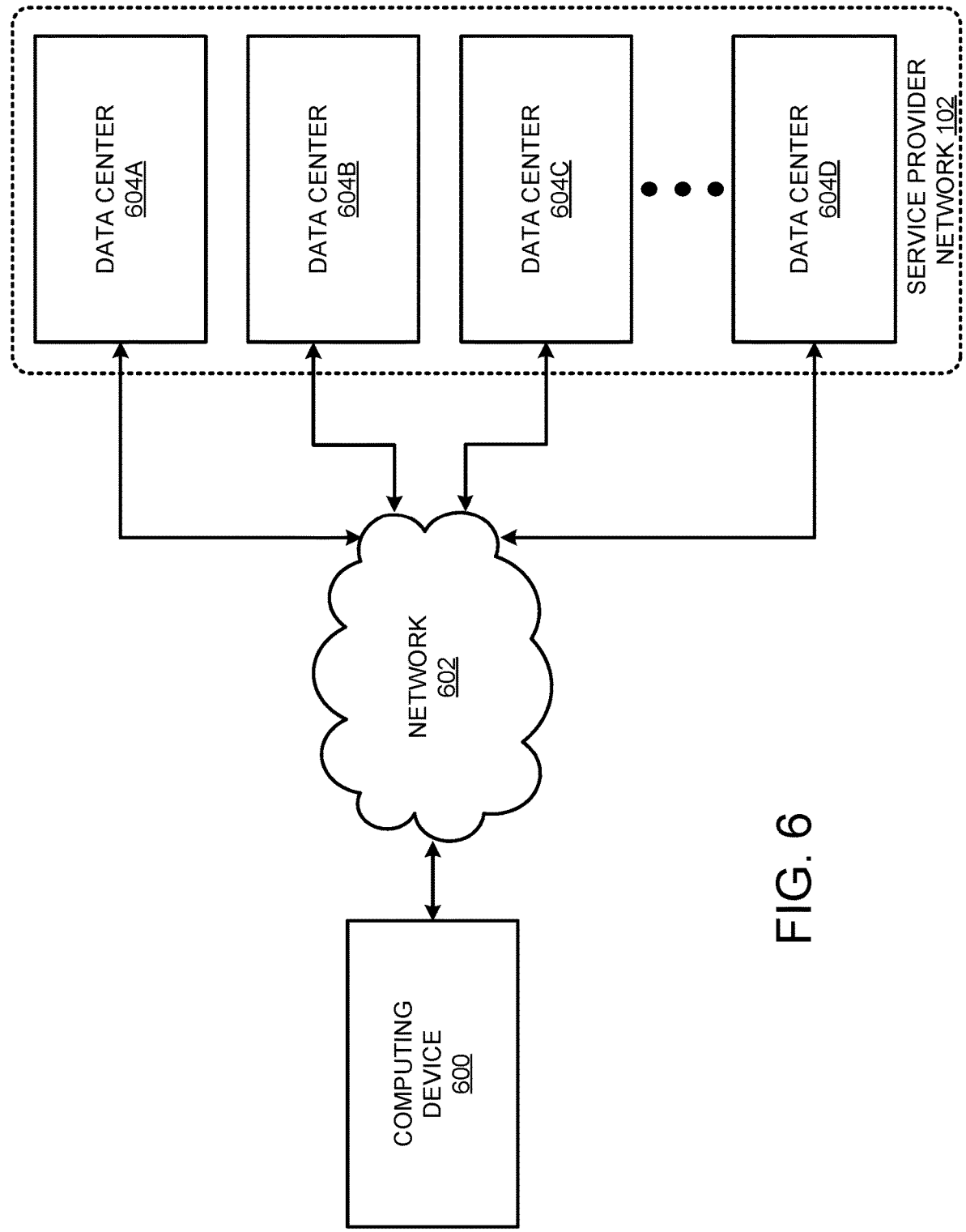
FIG. 6 is a system and network diagram that shows an illustrative operating environment including several data centers that can be configured to implement aspects of the functionality described herein.

FIG. 6 is a system and network diagram that shows one illustrative operating environment for the configurations disclosed herein that includes service provider network 102 that can be configured to provide the functionality described above. As discussed above, the service provider network 102 can execute network services that provide computing resources for implementing the functionality disclosed herein. The computing resources implemented by the service provider network 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The service provider network 102 can also include and utilize other types of computing resources not mentioned specifically herein.

As also discussed above, the computing resources provided by the service provider network 102 are enabled in one implementation by one or more data centers 604A-604D (which might be referred to herein singularly as "a data center 604" or collectively as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 7.

The users can access the services provided by the service provider network 102 over a network 602, which can be a wide area communication network ("WAN"), such as the Internet, an intranet or an Internet service provider ("ISP") network or a combination of such networks. For example, and without limitation, a computing device 600 operated by a user or other user of service provider network 102, such as the computing device 134, can be utilized to access the service provider network 102 by way of the network 602. It should be appreciated that a local-area network ("LAN"), the Internet, or any other networking topology known in the art that connects the data centers 604 to remote users and other users can be utilized. It should also be appreciated that combinations of such networks can also be utilized.

Figure 7:
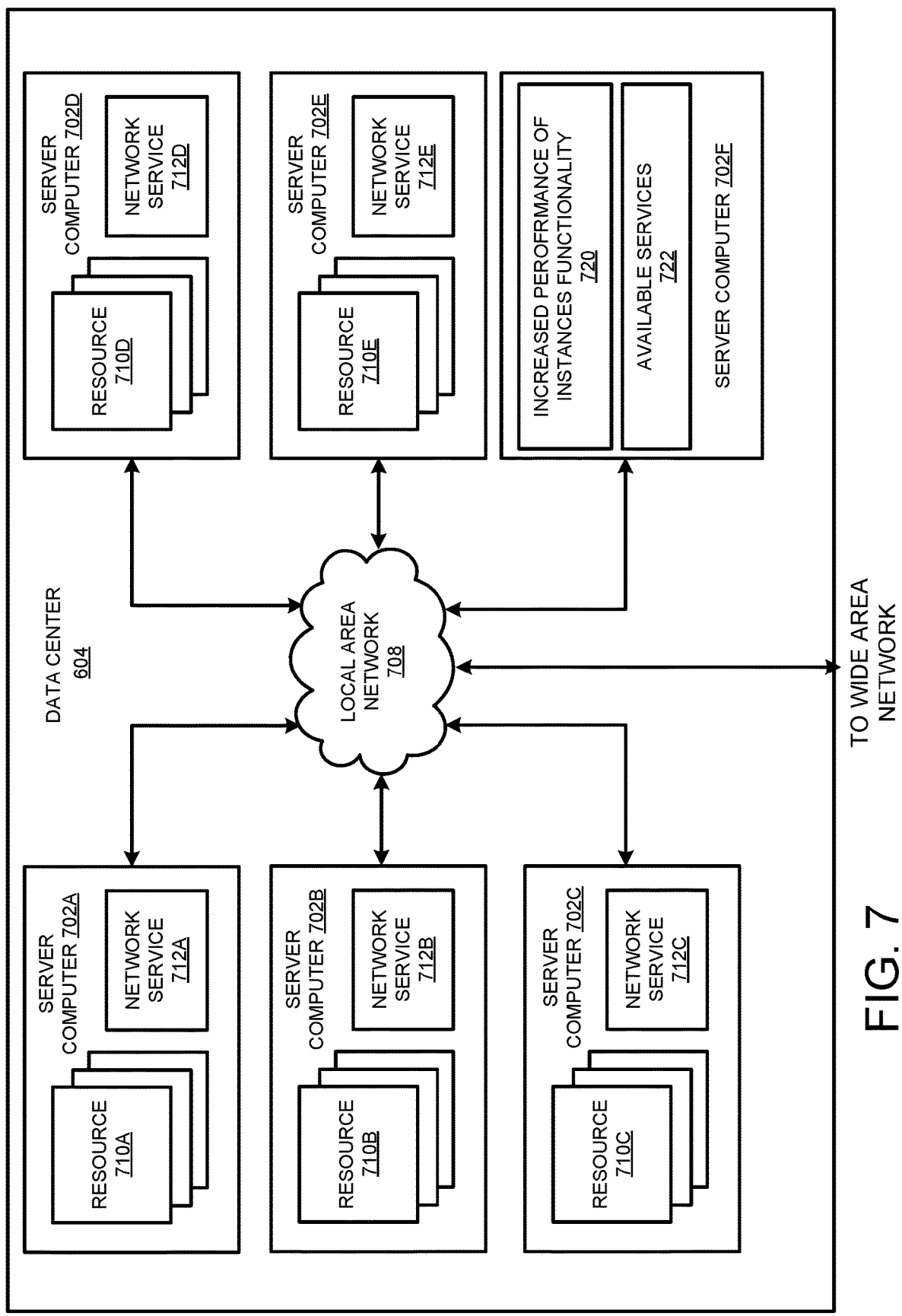
FIG. 7 is a computing system diagram illustrating a configuration for a data center that can be utilized to implement aspects of the technologies disclosed herein.

FIG. 7 is a computing system diagram that illustrates examples for a data center 604 that can be utilized to configure and manage a global network, and the other functionality disclosed herein. The example data center 604 shown in FIG. 7 includes several server computers 702A-702F (which might be referred to herein singularly as "a server computer 702" or in the plural as "the server computers 702").

The server computers 702 can be standard tower, rack-mount, or blade server computers configured appropriately for providing various types of computing resources 710 for implementing the functionality disclosed herein. As mentioned above, the computing resources 710 provided by the data center 604 can be data processing resources such as VM instances or hardware computing systems, data storage resources, database resources, networking resources, and others. Some of the servers 702 can also be configured to execute network services 712A-712E, respectively, capable of instantiating, providing and/or managing the computing resources 710A-710E.

The data center 604 shown in FIG. 7 also includes a server computer 702F that can execute some or all of the software components described above. For example, and without limitation, the server computer 702F can be configured to execute functionality described herein, such as increased performance of instances functionality 720 and other available services 722. The server computer 702F can also be configured to execute other components and/or to store data for providing some or all of the functionality described herein. In this regard, it should be appreciated that components or different instances of the services can execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604D, between each of the server computers 702A-702F in each data center 604, and, potentially, between computing resources 710 in each of the data centers 604. It should be appreciated that the configuration of the data center 604 described with reference to FIG. 7 is merely illustrative and that other implementations can be utilized.

Figure 8:
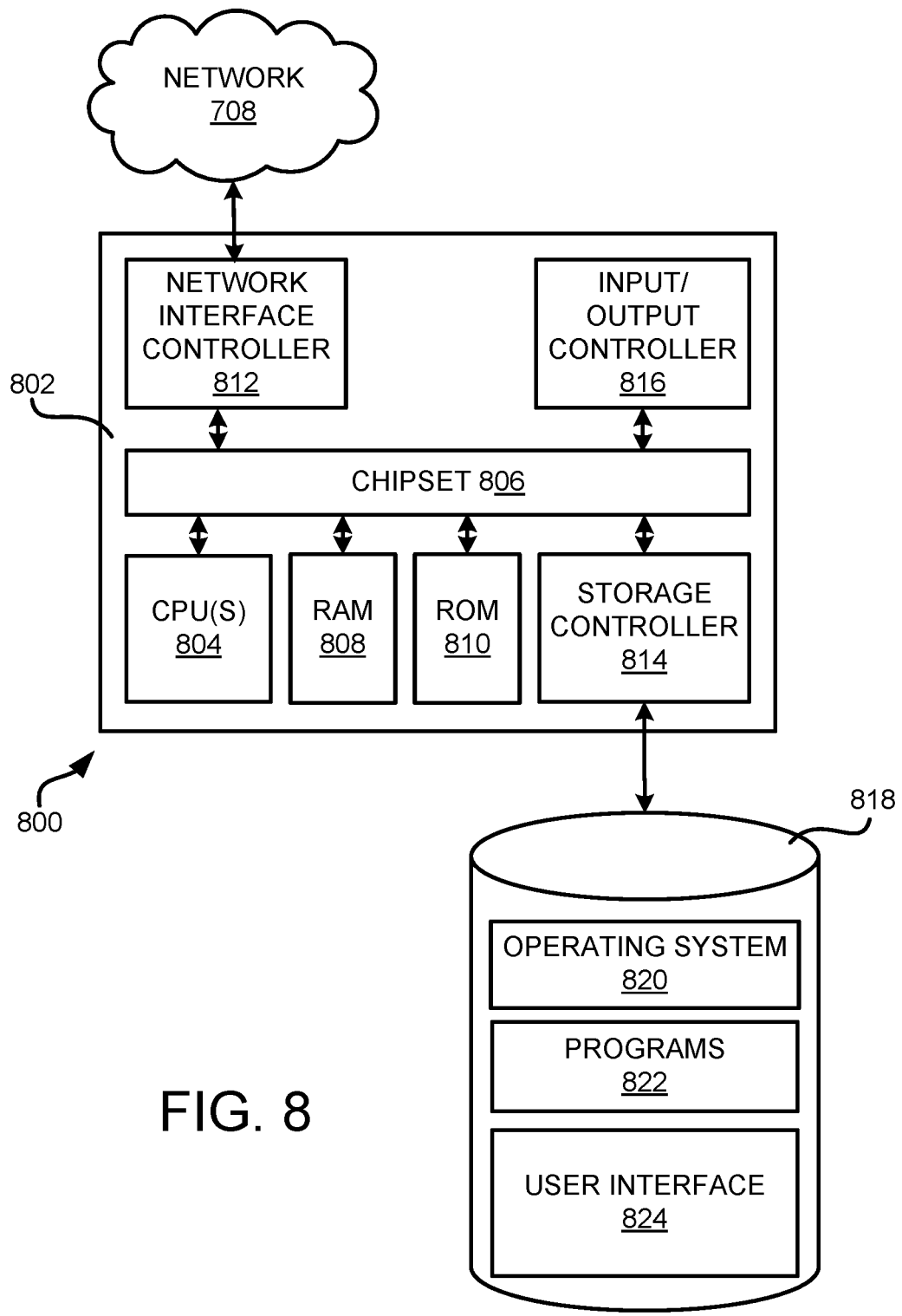
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic process that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 800 to other computing devices over the network 708. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822, user interface 824, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 818 can store other system or application programs and data utilized by the computer 800.

In examples, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to examples, the computer 800 has access to computer-readable storage media storing computer-executable instructions which, when executed by the computer 800, perform the various processes described above with regard to FIGS. 1-8. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for increasing the performance level of a burstable instance for a limited time period have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
one or more processors; and
one or more computer-readable media storing computer-executable instructions that, when executed by the one or more processors, cause the one or more processors to:
receive, from a computing device of a user of a service provider network, a reservation request to increase a baseline performance level of one or more virtual machine (VM) instances to an increased performance level of the one or more VM instances for a limited time period, wherein the baseline performance level is a level at which one or more central processing units (CPUs) configured to perform processing for the one or more VM instances can be utilized for a net credit balance of zero;
determine that the user is authorized to increase the baseline performance level to the increased performance level, wherein determining that the user is authorized includes determining that the user has at least one of a sufficient amount of credits to increase the baseline performance level for the limited time period, or a billing agreement to pay for the credits;
determine available physical computing devices of the service provider network that are available to host the one or more VM instances for the limited time period;
select one or more physical computing devices from the available physical computing devices to host the one or more VM instances during the limited time period such that the one or more VM instances have access to the increased performance level during the limited time period;
host the one or more VM instances on the one or more physical computing devices during the limited time period; and
return the one or more VM instances to the baseline performance level after the limited time period.

2. The system of claim 1, wherein the computer-executable instructions further cause the one or more processors to:
generate a schedule to migrate the one or more VM instances to the one or more physical computing devices; and
migrate, according to the schedule, the one or more VM instances to the one or more physical computing devices.

3. The system of claim 1, wherein the one or more VM instances are a burstable instance type, wherein the burstable instance type is allocated a variable quantity of first computing resources during the baseline performance level and a fixed quantity of second computing resources during the increased performance level.

4. The system of claim 1, wherein the computer-executable instructions further cause the one or more processors to provide for display, to the computing device of the user, a graphical user interface (GUI) that includes a display area including user interface (UI) elements that, upon selection, cause the reservation request to be generated.

5. A computer-implemented method comprising:
receiving, from a computing device of a user of a service provider network, a reservation request to increase a baseline performance level of one or more virtual machine (VM) instances to an increased performance level of the one or more VM instances for a limited time period, wherein the baseline performance level is a level at which one or more central processing units (CPUs) configured to perform processing for the one or more VM instances can be utilized;
determining that the user is authorized to increase the baseline performance level to the increased performance level;
determining available computing resources of the service provider network that are available to host the one or more VM instances for the limited time period;
determining a placement of the one or more VM instances on one or more computing resources, of the available computing resources, to host the one or more VM instances that are available to provide the increased performance level during the limited time period;
placing the one or more VM instances on the one or more computing resources, of the available computing resources, that provide the increased performance level during at least the limited time period; and
returning the one or more VM instances to the baseline performance level after the limited time period.

6. The computer-implemented method of claim 5, further comprising:
generating a schedule to migrate the one or more VM instances to one or more physical computing devices associated with the one or more computing resources; and
migrating, according to the schedule, the one or more VM instances to the one or more physical computing devices.

7. The computer-implemented method of claim 5, wherein the reservation request to increase the baseline performance level of the one or more VM instances to the increased performance level comprises a request to increase at least one of CPU utilization, an amount of memory, networking performance, or storage.

8. The computer-implemented method of claim 5, wherein the one or more VM instances are a burstable instance type, wherein the burstable instance type is allocated a variable quantity of computing resources during the baseline performance level and a fixed quantity of computing resources during the increased performance level.

9. The computer-implemented method of claim 5, wherein determining that the user is authorized includes determining that the user has at least one of a sufficient amount of credits to increase the baseline performance level to the increased performance level for the limited time period, or a billing agreement for the increased performance level for the limited time period.

10. The computer-implemented method of claim 5, further comprising:
generating a graphical user interface (GUI) that includes user interface (UI) elements that, upon selection, are configured for specifying the limited time period; and
providing the GUI to the computing device of the user.

11. The computer-implemented method of claim 10, further comprising:

generating a graphical representation that depicts one or more first time periods for the baseline performance level and one or more second time periods for the increased performance level,
wherein the GUI includes the graphical representation.

12. The computer-implemented method of claim 5, further comprising providing an application programming interface (API) that exposes functionality for reserving the increase of the baseline performance level to the increased performance level.

13. A system comprising:
one or more processors associated with a service provider network; and
one or more computer-readable media storing one or more computer-executable instructions that, when executed by the one or more processors, cause the one or more processors to:
receive, from a computing device of a user of a service provider network, a reservation request to increase a performance level of one or more virtual machine (VM) instances to an increased performance level of the one or more VM instances for a limited time period, wherein the baseline performance level of the one or more VM instances is a level at which one or more central processing units (CPUs) configured to perform processing for the one or more VM instances can be utilized;
determine that the user is authorized to increase the baseline performance level to the increased performance level;
determine available computing resources of the service provider network that are available to host the one or more VM instances for the limited time period;
determine a placement of the one or more VM instances on one or more computing resources, of the available computing resources, to host the one or more VM instances that are available to provide the increased performance level during the limited time period;
place the one or more VM instances on one or more computing resources, of the available computing resources, that provide the increased performance level during at least the limited time period; and
return the one or more VM instances to the baseline performance level after the limited time period.

14. The system of claim 13, wherein the one or more computer-executable instructions further cause the one or more processors to:
generate a schedule to migrate the one or more VM instances to one or more physical computing devices associated with the one or more computing resources; and
migrate, according to the schedule, the one or more VM instances to the one or more physical computing devices.

15. The system of claim 13, wherein the one or more computer-executable instructions further cause the one or more processors to:
determine a placement of the one or more VM instances on the one or more computing resources to host the one or more VM instances during the limited time period.

16. The system of claim 13, wherein the one or more VM instances are a burstable instance type, wherein the burstable instance type is allocated a variable quantity of computing resources during the baseline performance level and a fixed quantity of computing resources during the increased performance level.

17. The system of claim 13, wherein the reservation request to increase the baseline performance level comprises a request to an increase of at least one of CPU utilization, an amount of memory, networking performance, or storage.

18. The system of claim 13, wherein the one or more computer-executable instructions further cause the one or more processors to:
   generate a graphical user interface (GUI) that includes user interface (UI) elements that, upon selection, are configured for specifying the limited time period; and
   providing the GUI to the computing device of the user.

19. The system of claim 18, wherein the one or more computer-executable instructions further cause the one or more processors to:
   generate a graphical representation that depicts one or more first time periods for the baseline performance level and one or more second time periods for the increased performance level,
   wherein the GUI includes the graphical representation.

20. The system of claim 13, wherein the one or more computer-executable instructions further cause the one or more processors to provide an application programming interface (API) that exposes functionality for reserving the increase of the baseline performance level to the increased performance level.

* * * * *